United States Patent
Lin et al.

(10) Patent No.: US 9,964,759 B2
(45) Date of Patent: May 8, 2018

(54) IMAGE CAPTURING SYSTEM, IMAGE CAPTURING MODULE AND ELECTRONIC DEVICE

(71) Applicant: LARGAN PRECISION CO., LTD., Taichung (TW)

(72) Inventors: Cheng-Feng Lin, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 174 days.

(21) Appl. No.: 14/950,398

(22) Filed: Nov. 24, 2015

(65) Prior Publication Data

US 2017/0115481 A1 Apr. 27, 2017

(30) Foreign Application Priority Data

Oct. 23, 2015 (TW) .............................. 104217040 U

(51) Int. Cl.
| | | |
|---|---|---|
| G02B 27/00 | (2006.01) | |
| G02B 7/02 | (2006.01) | |
| G02B 7/00 | (2006.01) | |
| G02B 13/00 | (2006.01) | |

(52) U.S. Cl.
CPC ......... *G02B 27/0018* (2013.01); *G02B 7/003* (2013.01); *G02B 7/021* (2013.01); *G02B 13/001* (2013.01)

(58) Field of Classification Search
CPC . G02B 7/00; G02B 7/02; G02B 7/021; G02B 7/023; G02B 7/026; G02B 7/028; G02B 28/0018; G02B 27/0018; G02B 27/0149; G02B 27/028; G02B 27/0988
See application file for complete search history.

(56) References Cited

U.S. PATENT DOCUMENTS

| | | | |
|---|---|---|---|
| 5,894,369 A * | 4/1999 | Akiba ................ | A61B 1/00096 348/65 |
| 6,898,030 B1 | 5/2005 | Lin et al. | |
| 7,158,318 B2 | 1/2007 | Shirie | |
| 7,855,847 B2 * | 12/2010 | Kawasaki .............. | G02B 7/007 359/819 |
| 8,049,978 B1 * | 11/2011 | Su ........................ | G02B 25/002 359/811 |

(Continued)

FOREIGN PATENT DOCUMENTS

TW 201531762 A 8/2015

*Primary Examiner* — Thong Nguyen
(74) *Attorney, Agent, or Firm* — Muncy, Geissler, Olds & Lowe PC

(57) ABSTRACT

An image capturing system includes a barrel, a lens assembly, at least one planar light shielding sheet and at least one space maintaining member. The lens assembly includes lens elements disposed in the barrel. The planar light shielding sheet has an aperture for light to travel through. The space maintaining member is disposed in the barrel for adjusting a relative position of two of the lens elements. The space maintaining member includes a regulating portion, and the regulating portion includes an annular groove. The planar light shielding sheet is assembled to the annular groove, and the regulating portion is for adjusting and limiting a position of the planar light shielding sheet. A thickness of the planar light shielding sheet is smaller than a width of the annular groove.

22 Claims, 17 Drawing Sheets

(56) References Cited

U.S. PATENT DOCUMENTS

| | | | |
|---|---|---|---|
| 8,373,938 B2 | 2/2013 | Sasaki et al. | |
| 2011/0050978 A1* | 3/2011 | Yano | B32B 37/12 |
| | | | 348/335 |
| 2016/0161702 A1* | 6/2016 | Yang | G02B 7/028 |
| | | | 359/503 |

* cited by examiner

IMAGE CAPTURING SYSTEM, IMAGE CAPTURING MODULE AND ELECTRONIC DEVICE

RELATED APPLICATIONS

This application claims priority to Taiwan Application 104217040, filed Oct. 23, 2015, which is incorporated by reference herein in its entirety.

BACKGROUND

Technical Field

The present disclosure relates to an image capturing system, an image capturing module and an electronic device, more particularly to an image capturing system and an image capturing module applicable to an electronic device.

Description of Related Art

With the popularity of electronic devices with high-end specifications, such as smart phones, wearable apparatus and tablet computers, the demand of image capturing system has increased significantly. In recent years, the image capturing system has been applied to vehicle apparatus and smart house appliances. Since the advanced devices, such as vehicle backup cameras and lane departure warning systems, demand better image quality, the requirements for high resolution and image quality of image capturing system increase significantly. Some of conventional image capturing systems may have a light shielding sheet for eliminating the stray light and a space maintaining member for adjusting the distance between two lens elements and preventing adjacent two surfaces of the two lens elements from damage due to friction or collision.

When the light shielding sheet in the conventional image capturing system is not properly positioned, the light shielding sheet may be easily shifted away from an optical axis, and therefore the image quality may be deteriorated. In order to position the light shielding sheet, the lens elements in the conventional image capturing system may be arranged for squeezing the light shielding sheet. However, squeezing the light shielding sheet by the lens elements easily deforms the light shielding sheet, and therefore the image quality still be deteriorated. Another way for positioning the light shielding sheet is to set an additional member for regulating the light shielding sheet, but it is unfavorable for keeping the image capturing system compact since most space in the conventional image capturing system has been occupied by the lens elements and the space maintaining member. Therefore, it is important to develop a compact image capturing system having a structure for regulating the light shielding sheet.

SUMMARY

According to one aspect of the present disclosure, an image capturing system includes a barrel, a lens assembly, at least one planar light shielding sheet and at least one space maintaining member. The lens assembly includes lens elements disposed in the barrel. The planar light shielding sheet has an aperture for light to travel through. The space maintaining member is disposed in the barrel for adjusting a relative position of two of the lens elements. The space maintaining member includes a regulating portion, and the regulating portion includes an annular groove. The planar light shielding sheet is assembled to the annular groove, and the regulating portion is for adjusting and limiting a position of the planar light shielding sheet. A thickness of the planar light shielding sheet is smaller than a width of the annular groove.

According to another aspect of the present disclosure, an image capturing module includes the aforementioned image capturing system and an image sensor, wherein the image sensor is disposed on an image surface of the image capturing system.

According to still another aspect of the present disclosure, an electronic device includes the aforementioned image capturing module.

According to still yet another aspect of present disclosure, an image capturing system includes a barrel, a lens assembly and at least one planar light shielding sheet. The lens assembly includes lens elements disposed in the barrel. The planar light shielding sheet is disposed in the barrel. The planar light shielding sheet is spaced apart from the lens elements. The image capturing system further includes at least one regulating structure, and the regulating structure includes an annular groove. The planar light shielding sheet is assembled to the annular groove. The regulating structure is for adjusting and limiting a position of the planar light shielding sheet, and the regulating structure and the image capturing system are an unitary structure.

BRIEF DESCRIPTION OF THE DRAWINGS

The disclosure can be more understood by reading the following detailed description of the embodiments, with reference made to the accompanying drawings as follows.

DETAILED DESCRIPTION

1st Embodiment

Figure 1:
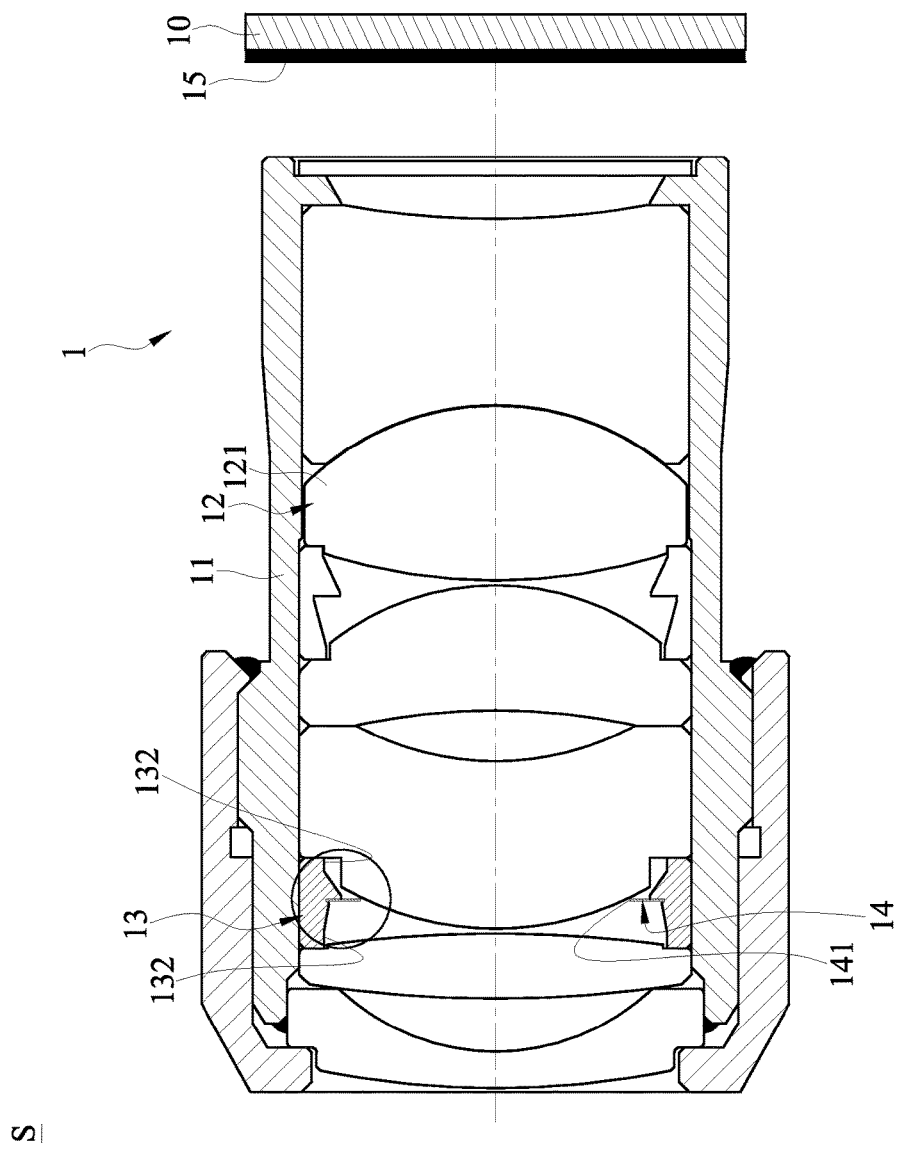
FIG. 1 is a schematic view of an image capturing module according to the 1st embodiment of the present disclosure.
Figure 2:
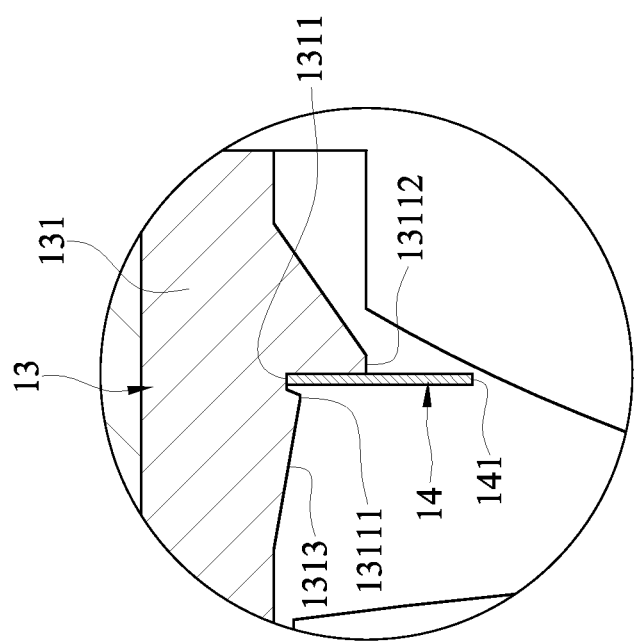
FIG. 2 is an enlarged view of the image capturing module in FIG. 1.
Figure 3:
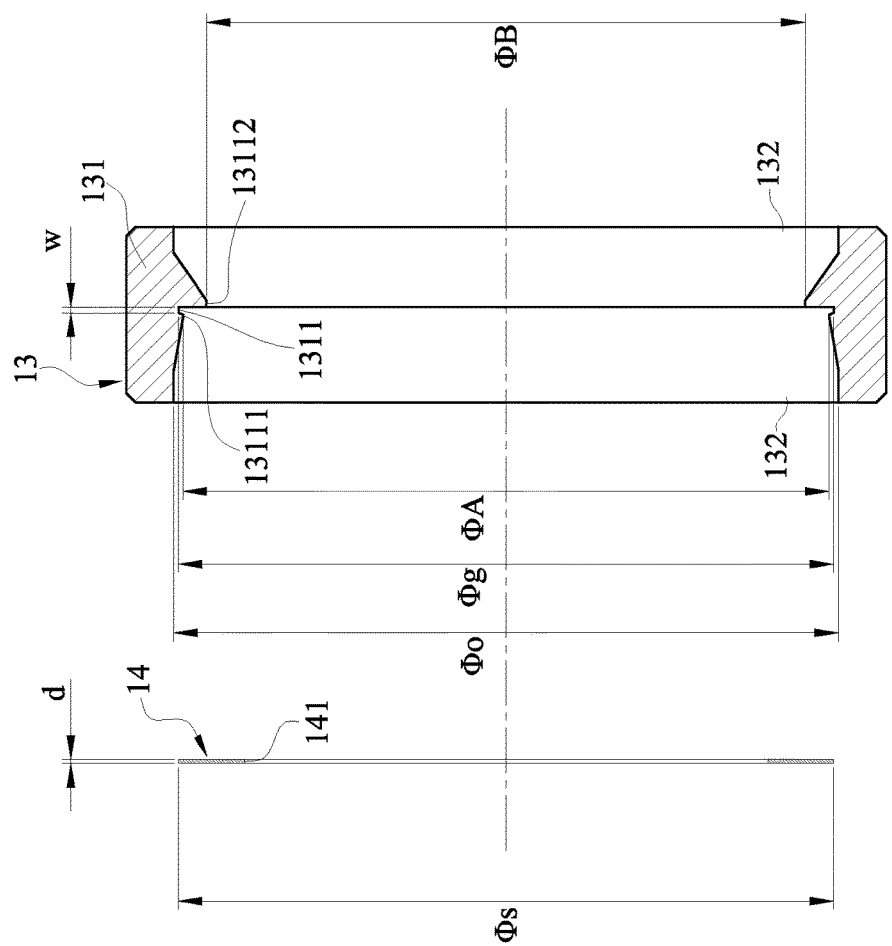
FIG. 3 is a schematic view of definitions of parameters in the image capturing module in FIG. 1.

FIG. 1 is a schematic view of an image capturing module according to the 1st embodiment of the present disclosure. FIG. 2 is an enlarged view of the image capturing module in FIG. 1. FIG. 3 is a schematic view of definitions of parameters in the image capturing module in FIG. 1. In FIG. 1, an image capturing module S includes an image capturing system 1 and an image sensor 10. The image capturing system 1 includes a barrel 11, a lens assembly 12, a space maintaining member 13, a planar light shielding sheet 14 and an image surface 15. The image sensor 10 is disposed on or near the image surface 15. The number of the space maintaining member 13 and that of the planar light shielding sheet 14 are both one in this embodiment, but the present disclosure is not limited thereto. In some embodiments, the image capturing system 1 can include a plurality of space maintaining members 13 and a plurality of planar light shielding sheets 14.

The lens assembly 12 includes a plurality of lens elements 121 disposed in the barrel 11. The lens elements 121 are arranged sequentially from an object side of the image capturing system 1 to an image side of the image capturing system 1. The lens assembly 12 may further include a filter.

The space maintaining member 13 is disposed in the barrel 11 for adjusting a relative position of two of the lens elements 121 that are adjacent to each other. That is, the space maintaining member 13 is movable relative to the barrel 11 for adjusting and maintaining a distance between two of the lens elements 121 which are respectively located at two ends of the space maintaining member 13 that are opposite to each other. The space maintaining member 13 includes a regulating portion 131, and the regulating portion 131 includes an annular groove 1311. The space maintaining member 13 may have two openings 132 which are respectively located at two ends of the space maintaining member 13 that are opposite to each other. The annular groove 1311 may have two holes 13111 and 13112 which are respectively located at two ends of the annular groove that are opposite to each other. The two openings 132, the annular groove 1311 and the two holes 13111 and 13112 are communicated with each other. Moreover, the regulating portion 131 may further include an opening narrow structure 1313 located at a side of the regulating portion 131. Two ends of the opening narrow structure 1313 that are opposite to each other are respectively located at the opening 132 close to the object and the hole 13112. In this embodiment, the space maintaining member 13 is disposed between two of the lens elements 121.

The planar light shielding sheet 14 can be made of carbonfeather composite material. The planar light shielding sheet 14 may include an inner layer and two outer layers, and the two outer layers are respectively adhered to two surfaces of the inner layer that are opposite to each other. Therefore, it is favorable for providing the planar light shielding sheet 14 with small thickness and sufficient elasticity so that the planar light shielding sheet 14 is capable of recovering from deformation caused by pressing or squeezing from the other components in the image capturing system 1. The planar light shielding sheet 14 has an aperture 141 for light to travel through. The planar light shielding sheet 14 is assembled to the annular groove 1311 of the regulating portion 131, and therefore the regulating portion 131 is for adjusting and limiting a position of the planar light shielding sheet 14. When the planar light shielding sheet 14 and the regulating portion 131 are assembled together, the planar light shielding sheet 14 is positioned without being pressed or squeezed by the other components so that the deformation of the planar light shielding sheet 14 is prevented, and therefore it is favorable for maintaining the shape of the aperture 141 on the planar light shielding sheet 14.

The regulating portion 131 and the space maintaining member 13 can be integrally formed. Therefore, it is favorable for reducing the number of the members in the barrel 11 so as to keep the image capturing system 1 compact.

When a diameter of the hole 13111 of the annular groove 1311 is $\phi A$, a diameter of the hole 13112 of the annular groove 1311 is $\phi B$, an outer diameter of the planar light shielding sheet 14 is $\phi s$, both of the diameters $\phi A$ and $\phi B$ can be smaller than the outer diameter $\phi s$. Therefore, it is favorable for firmly assembling the planar light shielding sheet 14 to the regulating portion 131.

When the larger of the two diameters $\phi A$ and $\phi B$ is $\phi$, the outer diameter of the planar light shielding sheet 14 is $\phi s$, the following condition can be satisfied: $0.01$ mm$<(\phi s-\phi)/2<0.07$ mm. Therefore, it is favorable for improving the precision in the manufacturing process, and thereby the planar light shielding sheet 14 is prevented from damage when assembled to the regulating portion 131. In this embodiment, the diameter $\phi A$ of the hole 13111 is larger than the diameter $\phi B$ of the hole 13112 so that the diameter $\phi A$ is $\phi$.

One of the two ends of the space maintaining member 13 can touch one of the lens elements 121. When a diameter of the annular groove 1311 is $\phi g$, a diameter of the opening 132 located at the end of the space maintaining member 13 touching the lens element 121 is $\phi o$, the diameter $\phi g$ can be smaller than the diameter $\phi o$. Therefore, it is favorable for assembling the components in the barrel 11 so as to maintain the flatness of the planar light shielding sheet 14.

When a thickness of the planar light shielding sheet 14 is d, and a width of the annular groove 1311 is w, the thickness d can be smaller than the width w. Therefore, the annular groove 1311 provides sufficient amount of space for accommodating the planar light shielding sheet 14.

When the width of the annular groove 1311 is w, the following condition can be satisfied: $0.02$ mm$<w<0.12$ mm. Therefore, it is favorable for further improving the accuracy in the manufacturing process. Preferably, the following condition can also be satisfied: $0.03$ mm$<w<0.09$ mm.

When the thickness of the planar light shielding sheet 14 is d, the following condition can be satisfied: $0.01$ mm$<d<0.06$ mm. Therefore, it is favorable for eliminating the stray light.

The planar light shielding sheet 14 can be spaced apart from the lens elements 121. That is, the planar light shielding sheet 14 may not touch any one of the lens elements 121. Therefore, it is favorable for preventing the aperture 141 from being blocked by the lens elements 121 so as to keep sufficient amount of incident light.

The space maintaining member 13 can be made of metallic material such as brass containing lead, phosphor bronze and alloys containing copper. Therefore, it is favorable for improving the machinability of the space maintaining member 13.

The planar light shielding sheet 14 can be assembled to the annular groove 1311 from a side of the regulating portion 131. In detail, the planar light shielding sheet 14 can be assembled to the annular groove 1311 from the side of the regulating portion 131 at which the opening narrow structure 1313 is located. In this embodiment, the opening narrow structure 1313 is located at the side of the regulating portion 131 close to the object side, and the planar light shielding sheet 14 is assembled to the annular groove 1311 from the side of the regulating portion 131 close to the object. Therefore, it is favorable for fluently assembling the planar light shielding sheet 14 to the regulating portion 131.

A minimum diameter of the opening narrow structure 1313 can be smaller than the outer diameter φs of the planar light shielding sheet 14. Therefore, it is favorable for improving assembly quality of the components in the barrel 11 and maintaining the flatness of the planar light shielding sheet 14.

The minimum diameter of the opening narrow structure 1313 can be equal to the diameter φA of the hole 13111 or the diameter φB of the hole 13112. Therefore, it is favorable for firmly fixing the planar light shielding sheet 14 to the regulating portion 131 and avoiding separation of the planar light shielding sheet 14 and the regulating portion 131. In this embodiment, the minimum diameter of the opening narrow structure 1313 is equal to the diameter φB.

The aforementioned parameters in the 1st embodiment have the following values shown in millimeters (mm).

| 1st Embodiment | | | |
|---|---|---|---|
| Φo | 7.00 | Φg | 6.90 |
| ΦA | 6.80 | (Φs − Φ)/2 | 0.05 |
| ΦB | 6.30 | w | 0.06 |
| Φ | 6.80 | d | 0.04 |
| Φs | 6.90 | | |

2nd Embodiment

Figure 4:
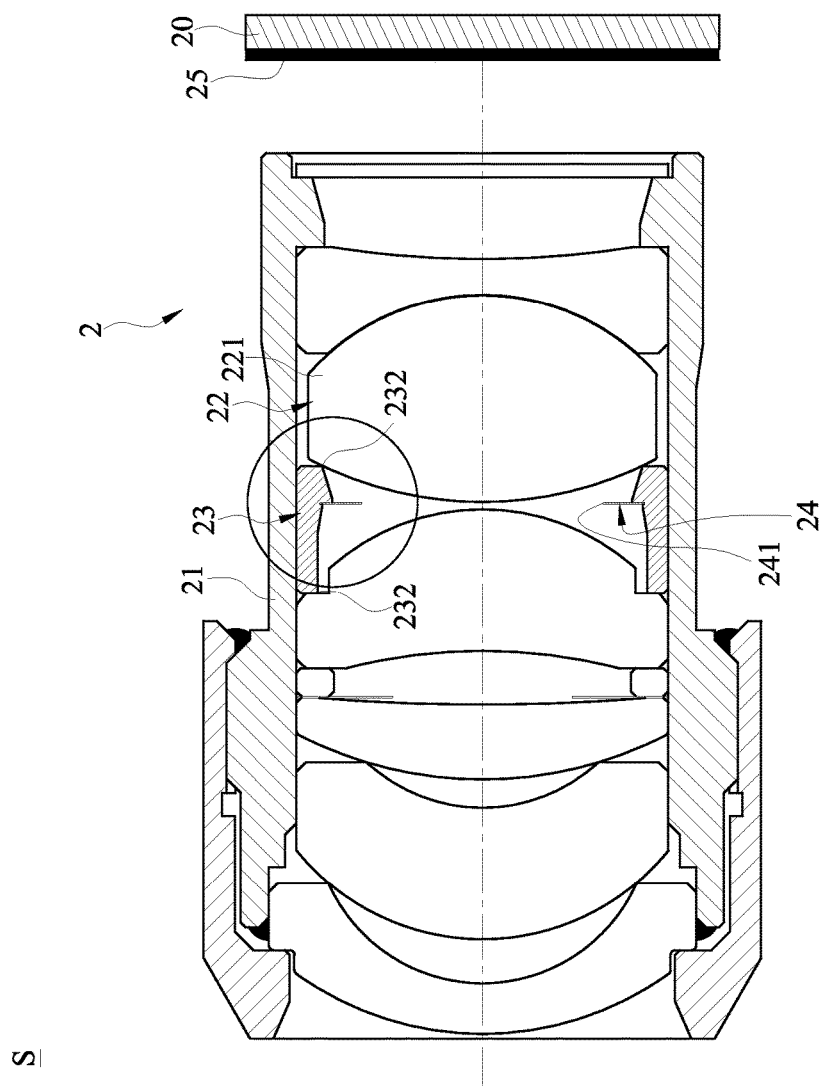
FIG. 4 is a schematic view of an image capturing module according to the 2nd embodiment of the present disclosure.
Figure 5:
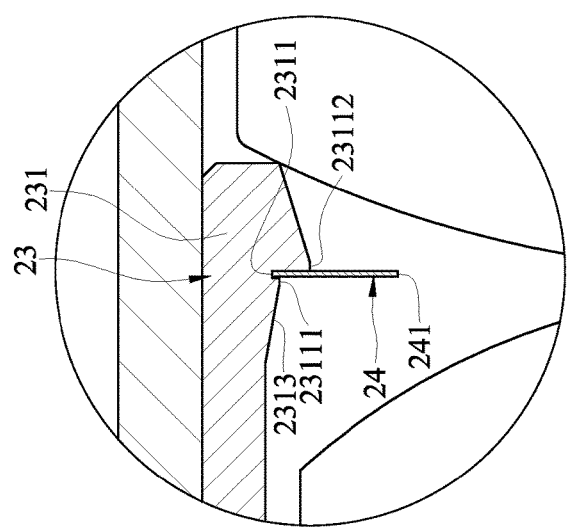
FIG. 5 is an enlarged view of the image capturing module in FIG. 4.

FIG. 4 is a schematic view of an image capturing module according to the 2nd embodiment of the present disclosure. FIG. 5 is an enlarged view of the image capturing module in FIG. 4. In FIG. 4 and FIG. 5, an image capturing module S includes an image capturing system 2 and an image sensor 20. The image capturing system 2 includes a barrel 21, a lens assembly 22, a space maintaining member 23, a planar light shielding sheet 24 and an image surface 25. The image sensor 20 is disposed on or near the image surface 25. The number of the space maintaining member 23 and that of the planar light shielding sheet 24 are both one in this embodiment, but the present disclosure is not limited thereto. In some embodiments, the image capturing system 2 can include a plurality of space maintaining members 23 and a plurality of planar light shielding sheets 24.

The lens assembly 22 includes a plurality of lens elements 221 disposed in the barrel 21. The lens elements 221 are arranged sequentially from an object side of the image capturing system 2 to an image side of the image capturing system 2.

The space maintaining member 23 is disposed in the barrel 21 for adjusting a relative position of two of the lens elements 221 that are adjacent to each other. The space maintaining member 23 includes a regulating portion 231, and the regulating portion 231 includes an annular groove 2311. The space maintaining member 23 may have two openings 232 which are respectively located at two ends of the space maintaining member 23 that are opposite to each other. The annular groove 2311 may have two holes 23111 and 23112 which are respectively located at two ends of the annular groove 2311 that are opposite to each other. The two openings 232, the annular groove 2311 and the two holes 23111 and 23112 are communicated with each other. Moreover, the regulating portion 231 may further include an opening narrow structure 2313 located at a side of the regulating portion 231. Two ends of the opening narrow structure 2313 that are opposite to each other are respectively located at the opening 232 close to the object side and the hole 23112. In this embodiment, the space maintaining member 23 is disposed between two adjacent lens elements of the lens elements 221.

The planar light shielding sheet 24 can be made of carbonfeather composite material and has an aperture 241 for light to travel through. The planar light shielding sheet 24 is assembled to the annular groove 2311 of the regulating portion 231, and the regulating portion 231 is for adjusting and limiting a position of the planar light shielding sheet 24.

The parameters in the 2nd embodiment have the following values shown in millimeters (mm). The definitions of the following parameters are the same as those stated in the 1st embodiment with corresponding values for the 2nd embodiment, so an explanation in this regard will not be provided again.

| 2nd Embodiment | | | |
|---|---|---|---|
| Φo | 7.11 | Φg | 7.00 |
| ΦA | 6.90 | (Φs − Φ)/2 | 0.05 |
| ΦB | 6.46 | w | 0.05 |
| Φ | 6.90 | d | 0.04 |
| Φs | 7.00 | | |

3rd Embodiment

Figure 6:
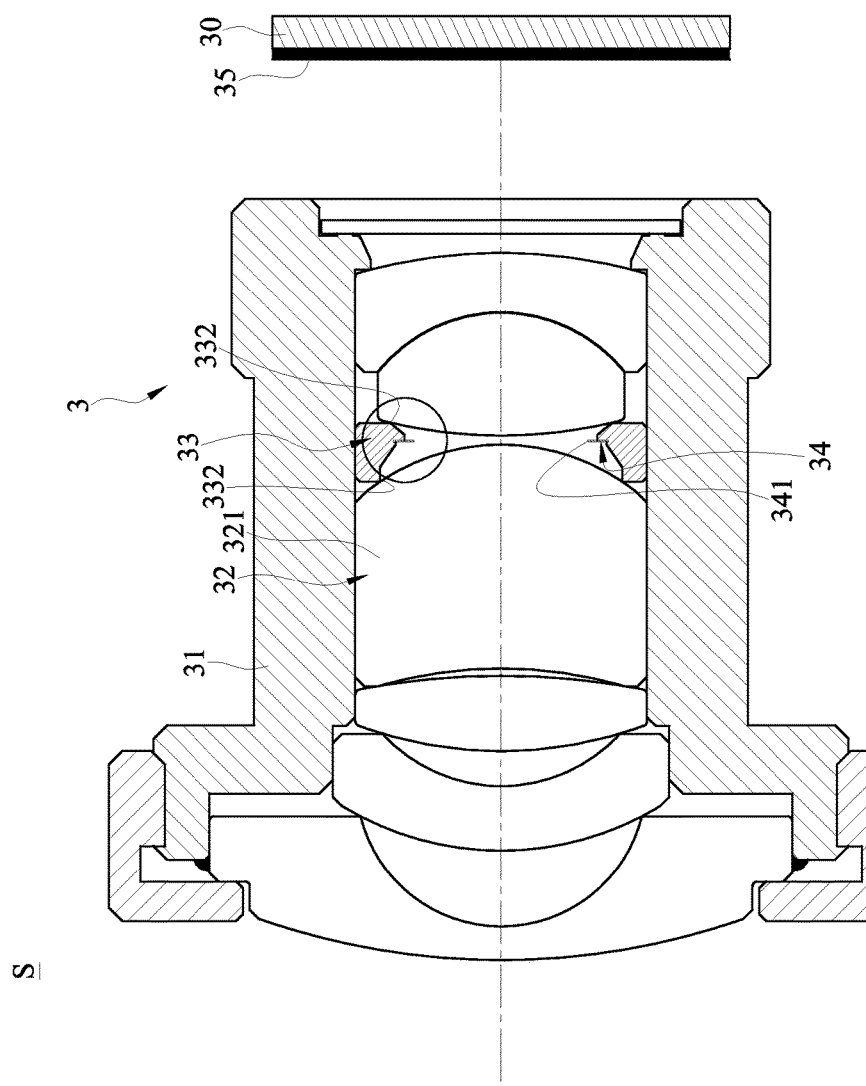
FIG. 6 is a schematic view of an image capturing module according to the 3rd embodiment of the present disclosure.
Figure 7:
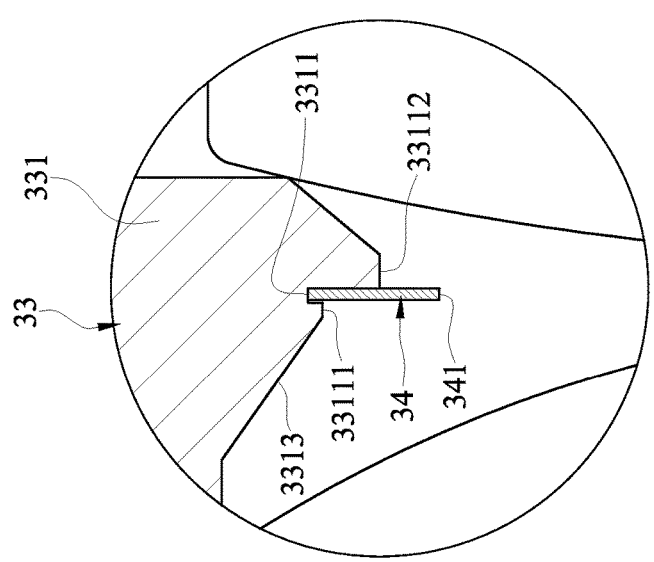
FIG. 7 is an enlarged view of the image capturing module in FIG. 6.

FIG. 6 is a schematic view of an image capturing module according to the 3rd embodiment of the present disclosure. FIG. 7 is an enlarged view of the image capturing module in FIG. 6. In FIG. 6 and FIG. 7, an image capturing module S includes an image capturing system 3 and an image sensor 30. The image capturing system 3 includes a barrel 31, a lens assembly 32, a space maintaining member 33, a planar light shielding sheet 34 and an image surface 35. The image sensor 30 is disposed on or near the image surface 35. The number of the space maintaining member 33 and that of the planar light shielding sheet 34 are both one in this embodiment, but the present disclosure is not limited thereto. In some embodiments, the image capturing system 3 can include a plurality of space maintaining members 33 and a plurality of planar light shielding sheets 34.

The lens assembly 32 includes a plurality of lens elements 321 disposed in the barrel 31. The lens elements 321 are arranged sequentially from an object side of the image capturing system 3 to an image side of the image capturing system 3.

The space maintaining member 33 is disposed in the barrel 31 for adjusting a relative position of two of the lens elements 321 that are adjacent to each other. The space maintaining member 33 includes a regulating portion 331, and the regulating portion 331 includes an annular groove 3311. The space maintaining member 33 may have two openings 332 which are respectively located at two ends of the space maintaining member 33 that are opposite to each other. The annular groove 3311 may have two holes 33111 and 33112 which are respectively located at two ends of the annular groove 3311 that are opposite to each other. The two openings 332, the annular groove 3311 and the two holes 33111 and 33112 are communicated with each other. Moreover, the regulating portion 331 may further include an opening narrow structure 3313 located at a side of the regulating portion 331. Two ends of the opening narrow structure 3313 that are opposite to each other are respectively located at the opening 332 close to the object side and the hole 33112. In this embodiment, the space maintaining member 33 is disposed between two adjacent lens elements of the lens elements 321.

The planar light shielding sheet 34 can be made of carbonfeather composite material and has an aperture 341 for light to travel through. The planar light shielding sheet 34 is assembled to the annular groove 3311 of the regulating portion 331, and the regulating portion 331 is for adjusting and limiting a position of the planar light shielding sheet 34.

The parameters in the 3rd embodiment have the following values shown in millimeters (mm). The definitions of the following parameters are the same as those stated in the 1st embodiment with corresponding values for the 3rd embodiment, so an explanation in this regard will not be provided again.

| 3rd Embodiment | | | |
|---|---|---|---|
| $\Phi o$ | 5.40 | $\Phi g$ | 4.80 |
| $\Phi A$ | 4.70 | $(\Phi S - \Phi)/2$ | 0.05 |
| $\Phi B$ | 4.30 | w | 0.05 |
| $\Phi$ | 4.70 | d | 0.04 |
| $\Phi s$ | 4.80 | | |

4th Embodiment

Figure 8:
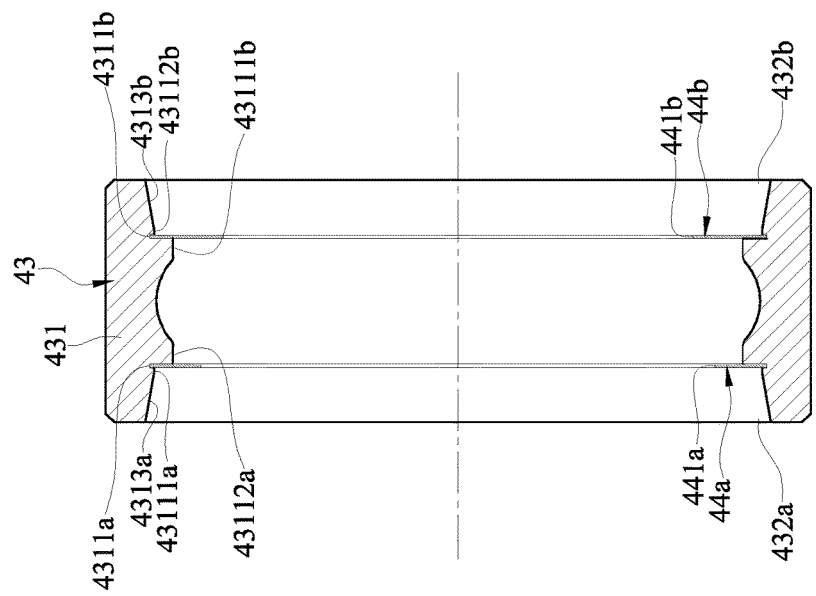
FIG. 8 is a schematic view of a space maintaining member and two planar light shielding sheets of an image capturing module according to the 4th embodiment of the present disclosure.

FIG. 8 is a schematic view of a space maintaining member and two planar light shielding sheets of an image capturing module according to the 4th embodiment of the present disclosure. As shown in FIG. 8, in this embodiment, an image capturing system of an image capturing module includes a space maintaining member 43 and two planar light shielding sheets 44a and 44b. All the space maintaining member 43, the planar light shielding sheets 44a and 44b can be located at any position in the barrel so that an illustration for the arrangement of the other components of the image capturing module is omitted hereafter.

The space maintaining member 43 includes a regulating portion 431, and the regulating portion 431 includes two annular groove 4311a and 4311b. The space maintaining member 43 may have two openings 432a and 432b which are respectively located at two ends of the space maintaining member 43 that are opposite to each other.

The annular groove 4311a may have two holes 43111a and 43112a which are respectively located at two ends of the annular groove 4311a that are opposite to each other. Moreover, the regulating portion 431 may further include an opening narrow structure 4313a. Two ends of the opening narrow structure 4313a that are opposite to each other are respectively located at the opening 432a and the hole 43112a.

The planar light shielding sheet 44a can be made of carbonfeather composite material and has an aperture 441a for light to travel through. The planar light shielding sheet 44a is assembled to the annular groove 4311a of the regulating portion 431, and the regulating portion 431 is for adjusting and limiting a position of the planar light shielding sheet 44a.

The parameters about the annular groove 4311a, the planar light shielding sheet 44a and the opening 432a in the 4th embodiment have the following values shown in millimeters (mm). The definitions of the following parameters are the same as those stated in the 1st embodiment with corresponding values for the 4th embodiment, so an explanation in this regard will not be provided again.

| 4th Embodiment (planar light shielding sheet 44a) | | | |
|---|---|---|---|
| $\Phi o$ | 7.10 | $\Phi g$ | 7.00 |
| $\Phi A$ | 6.90 | $(\Phi S - \Phi)/2$ | 0.05 |
| $\Phi B$ | 6.46 | w | 0.05 |
| $\Phi$ | 6.90 | d | 0.04 |
| $\Phi s$ | 7.00 | | |

The annular groove 4311b may have two holes 43111b and 43112b which are respectively located at two ends of the annular groove 4311b that are opposite to each other. Moreover, the regulating portion 431 may further include an opening narrow structure 4313b. Two ends of the opening narrow structure 4313b that are opposite to each other are respectively located at the opening 432b and the hole 43111b.

The planar light shielding sheet 44b can be made of carbonfeather composite material and has an aperture 441b for light to travel through. The planar light shielding sheet 44b is assembled to the annular groove 4311b of the regulating portion 431, and the regulating portion 431 is for adjusting and limiting a position of the planar light shielding sheet 44b.x The parameters about the annular groove 4311b, the planar light shielding sheet 44b and the opening 432b in the 4th embodiment have the following values shown in millimeters (mm). The definitions of the following parameters are the same as those stated in the 1st embodiment with corresponding values for the 4th embodiment, so an explanation in this regard will not be provided again.

| 4th Embodiment (planar light shielding sheet 44b) | | | |
|---|---|---|---|
| $\Phi o$ | 7.10 | $\Phi g$ | 7.00 |
| $\Phi A$ | 6.90 | $(\Phi S - \Phi)/2$ | 0.05 |
| $\Phi B$ | 6.46 | w | 0.05 |
| $\Phi$ | 6.90 | d | 0.04 |
| $\Phi s$ | 7.00 | | |

5th Embodiment

Figure 9:
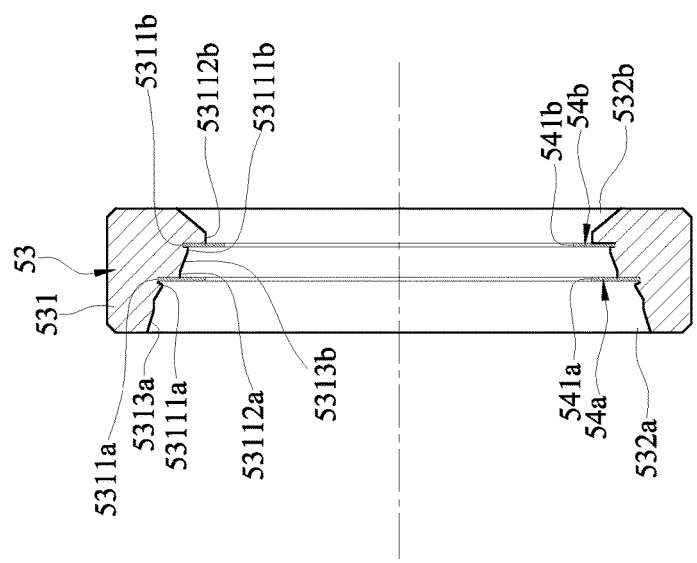
FIG. 9 is a schematic view of a space maintaining member and two planar light shielding sheets of an image capturing module according to the 5th embodiment of the present disclosure.

FIG. 9 is a schematic view of a space maintaining member and two planar light shielding sheets of an image capturing module according to the 5th embodiment of the present disclosure. As shown in FIG. 9, in this embodiment, an image capturing system of an image capturing module includes a space maintaining member 53 and two planar light shielding sheets 54a and 54b. All the space maintaining member 53, the planar light shielding sheets 54a and 54b can be located at any position in the barrel so that an illustration for the arrangement of the other components of the image capturing module is omitted hereafter.

The space maintaining member 53 includes a regulating portion 531, and the regulating portion 531 includes two annular groove 5311a and 5311b. The space maintaining member 53 may have two openings 532a and 532b which are respectively located at two ends of the space maintaining member 53 that are opposite to each other.

The annular groove 5311a may have two holes 53111a and 53112a which are respectively located at two ends of the annular groove 5311a that are opposite to each other. Moreover, the regulating portion 531 may further include an opening narrow structure 5313*a*. Two ends of the opening narrow structure 5313*a* that are opposite to each other are respectively located at the opening 532*a* and the hole 53112*a*.

The planar light shielding sheet 54*a* can be made of carbonfeather composite material and has an aperture 541*a* for light to travel through. The planar light shielding sheet 54*a* is assembled to the annular groove 5311*a* of the regulating portion 531, and the regulating portion 531 is for adjusting and limiting a position of the planar light shielding sheet 54*a*.

The parameters about the annular groove 5311*a*, the planar light shielding sheet 54*a* and the opening 532*a* in the 5th embodiment have the following values shown in millimeters (mm). The definitions of the following parameters are the same as those stated in the 1st embodiment with corresponding values for the 5th embodiment, so an explanation in this regard will not be provided again.

| 5th Embodiment (planar light shielding sheet 54a) | | | |
|---|---|---|---|
| Φo | 5.44 | Φg | 5.36 |
| ΦA | 5.26 | (ΦS − Φ)/2 | 0.05 |
| ΦB | 4.86 | w | 0.06 |
| Φ | 5.26 | d | 0.04 |
| Φs | 5.36 | | |

The annular groove 5311*b* may have two holes 53111*b* and 53112*b* which are respectively located at two ends of the annular groove 5311*b* that are opposite to each other. Moreover, the regulating portion 531 may further include an opening narrow structure 5313*b*. Two ends of the opening narrow structure 5313*b* that are opposite to each other are respectively located at the opening 532*b* and the hole 53111*b*.

The planar light shielding sheet 54*b* can be made of carbonfeather composite material and has an aperture 541*b* for light to travel through. The planar light shielding sheet 54*b* is assembled to the annular groove 5311*b* of the regulating portion 531, and the regulating portion 531 is for adjusting and limiting a position of the planar light shielding sheet 54*b*.

The parameters about the annular groove 5311*b*, the planar light shielding sheet 54*b* and the opening 532*b* in the 5th embodiment have the following values shown in millimeters (mm). The definitions of the following parameters are the same as those stated in the 1st embodiment with corresponding values for the 5th embodiment, so an explanation in this regard will not be provided again.

| 5th Embodiment (planar light shielding sheet 54b) | | | |
|---|---|---|---|
| Φo | 4.86 | Φg | 4.80 |
| ΦA | 4.70 | (ΦS − Φ)/2 | 0.05 |
| ΦB | 4.30 | w | 0.05 |
| Φ | 4.70 | d | 0.04 |
| Φs | 4.80 | | |

6th Embodiment

Figure 10:
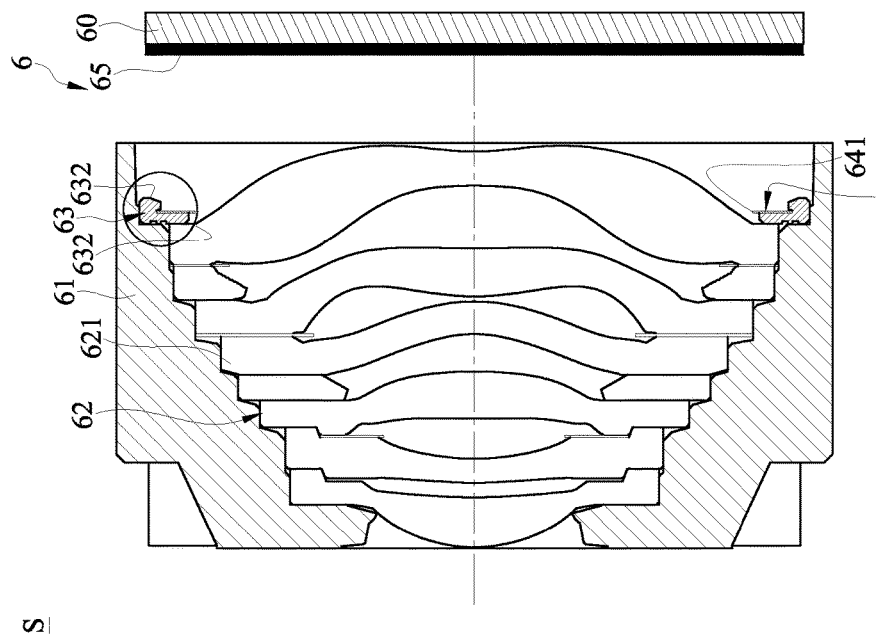
FIG. 10 is a schematic view of an image capturing module according to the 6th embodiment of the present disclosure.
Figure 11:
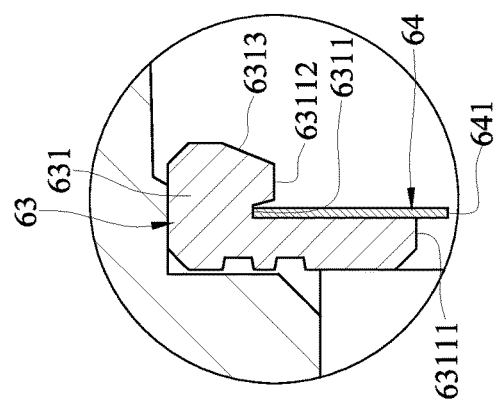
FIG. 11 is an enlarged view of the image capturing module in FIG. 10.

FIG. 10 is a schematic view of an image capturing module according to the 6th embodiment of the present disclosure. FIG. 11 is an enlarged view of the image capturing module in FIG. 10. In FIG. 10, an image capturing module S includes an image capturing system 6 and an image sensor 60. The image capturing system 6 includes a barrel 61, a lens assembly 62, a space maintaining member 63, a planar light shielding sheet 64 and an image surface 65. The image sensor 60 is disposed on or near the image surface 65. The number of the space maintaining member 63 and that of the planar light shielding sheet 64 are both one in this embodiment, but the present disclosure is not limited thereto. In some embodiments, the image capturing system 6 can include a plurality of space maintaining members 63 and a plurality of planar light shielding sheets 64.

The lens assembly 62 includes a plurality of lens elements 621 disposed in the barrel 61. The lens elements 621 are arranged sequentially from an object side of the image capturing system 6 to an image side of the image capturing system 6.

The space maintaining member 63 is disposed in the barrel 61 for adjusting a relative position of two of the lens elements 621 that are adjacent to each other. The space maintaining member 63 includes a regulating portion 631, and the regulating portion 631 includes an annular groove 6311. The space maintaining member 63 may have two openings 632 which are respectively located at two ends of the space maintaining member 63 that are opposite to each other. The annular groove 6311 may have two holes 63111 and 63112 which are respectively located at two ends of the annular groove 6311 that are opposite to each other. The two openings 632, the annular groove 6311 and the two holes 63111 and 63112 are communicated with each other. Moreover, the regulating portion 631 may further include an opening narrow structure 6313 located at a side of the regulating portion 631. Two ends of the opening narrow structure 6313 that are opposite to each other are respectively located at the opening 632 close to the image side and the hole 63111. In this embodiment, the space maintaining member 63 is disposed between one of the lens elements 62 and the image sensor 60.

The planar light shielding sheet 64 can be made of carbonfeather composite material and has an aperture 641 for light to travel through. The planar light shielding sheet 64 is assembled to the annular groove 6311 of the regulating portion 631, and the regulating portion 631 is for adjusting and limiting a position of the planar light shielding sheet 64.

The parameters in the 6th embodiment have the following values shown in millimeters (mm). The definitions of the following parameters are the same as those stated in the 1st embodiment with corresponding values for the 6th embodiment, so an explanation in this regard will not be provided again.

| 6th Embodiment | | | |
|---|---|---|---|
| Φo | 6.75 | Φg | 7.42 |
| ΦA | 7.32 | (ΦS − Φ)/2 | 0.05 |
| ΦB | 6.65 | w | 0.03 |
| Φ | 7.32 | d | 0.02 |
| Φs | 7.42 | | |

7th Embodiment

Figure 12:
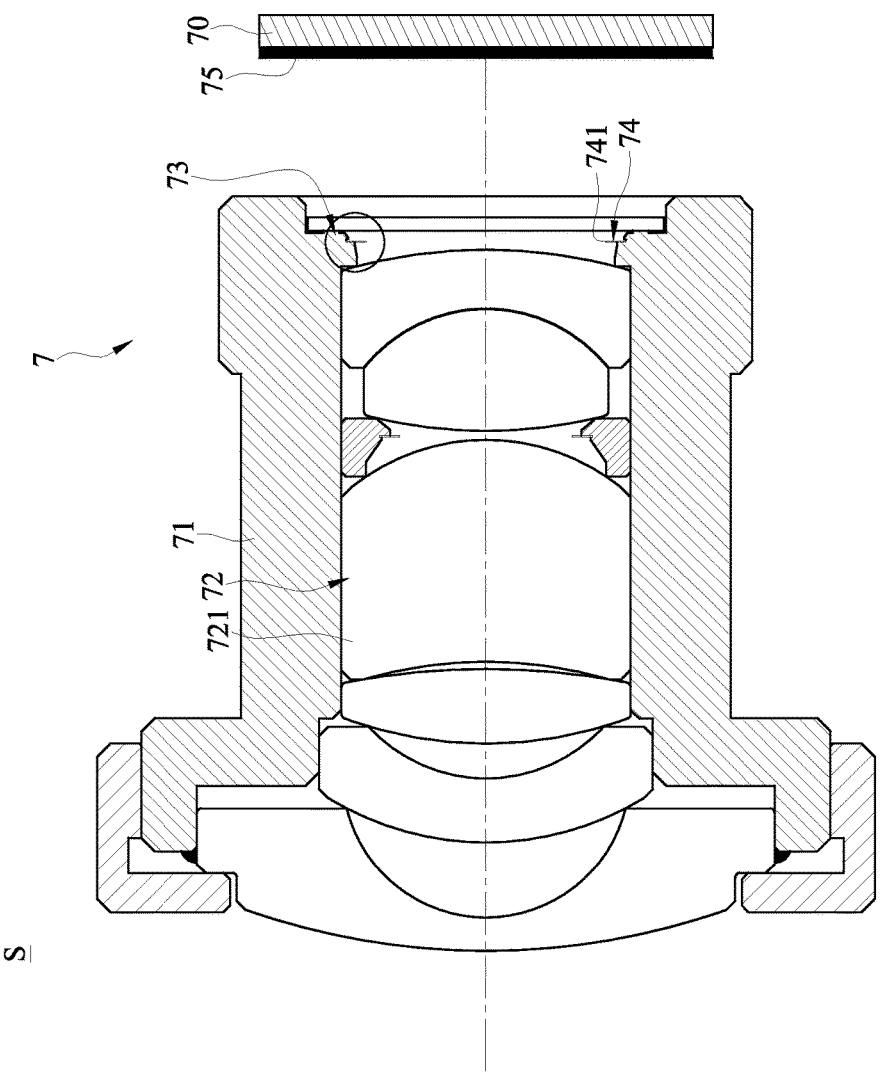
FIG. 12 is a schematic view of an image capturing module according to the 7th embodiment of the present disclosure.
Figure 13:
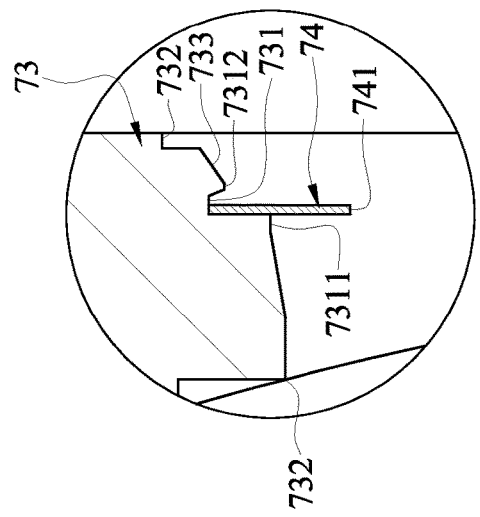
FIG. 13 is an enlarged view of the image capturing module in FIG. 12.
Figure 14:
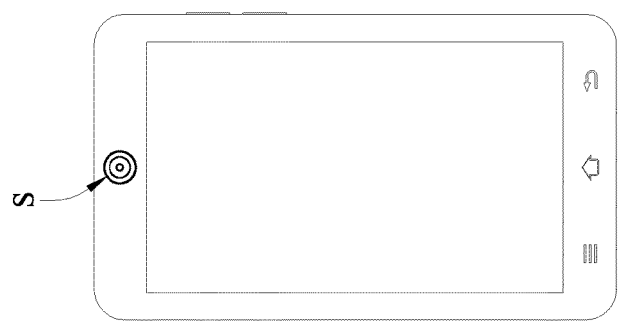
FIG. 14 shows an electronic device according to an embodiment.
Figure 15:
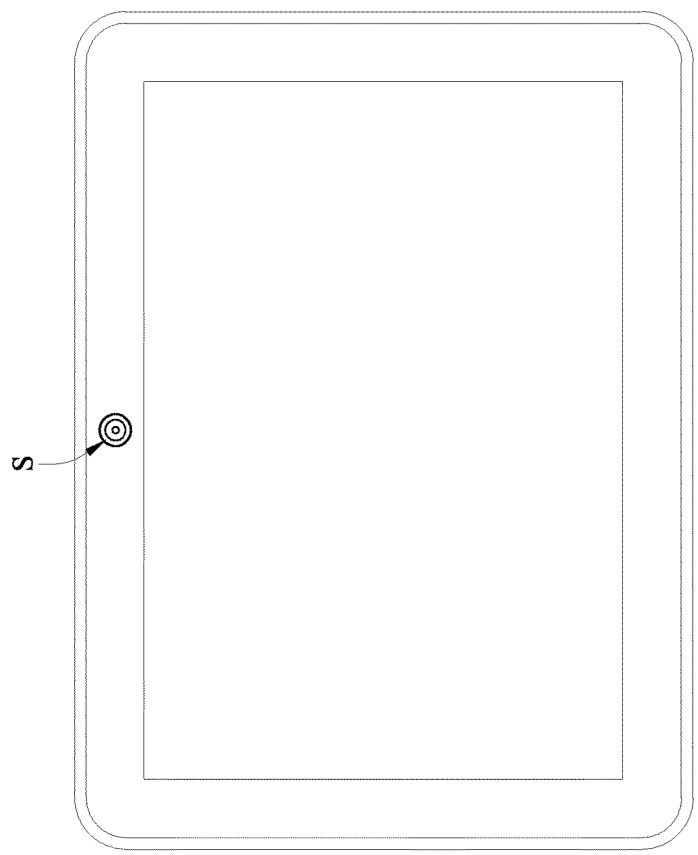
FIG. 15 shows an electronic device according to another embodiment.
Figure 16:
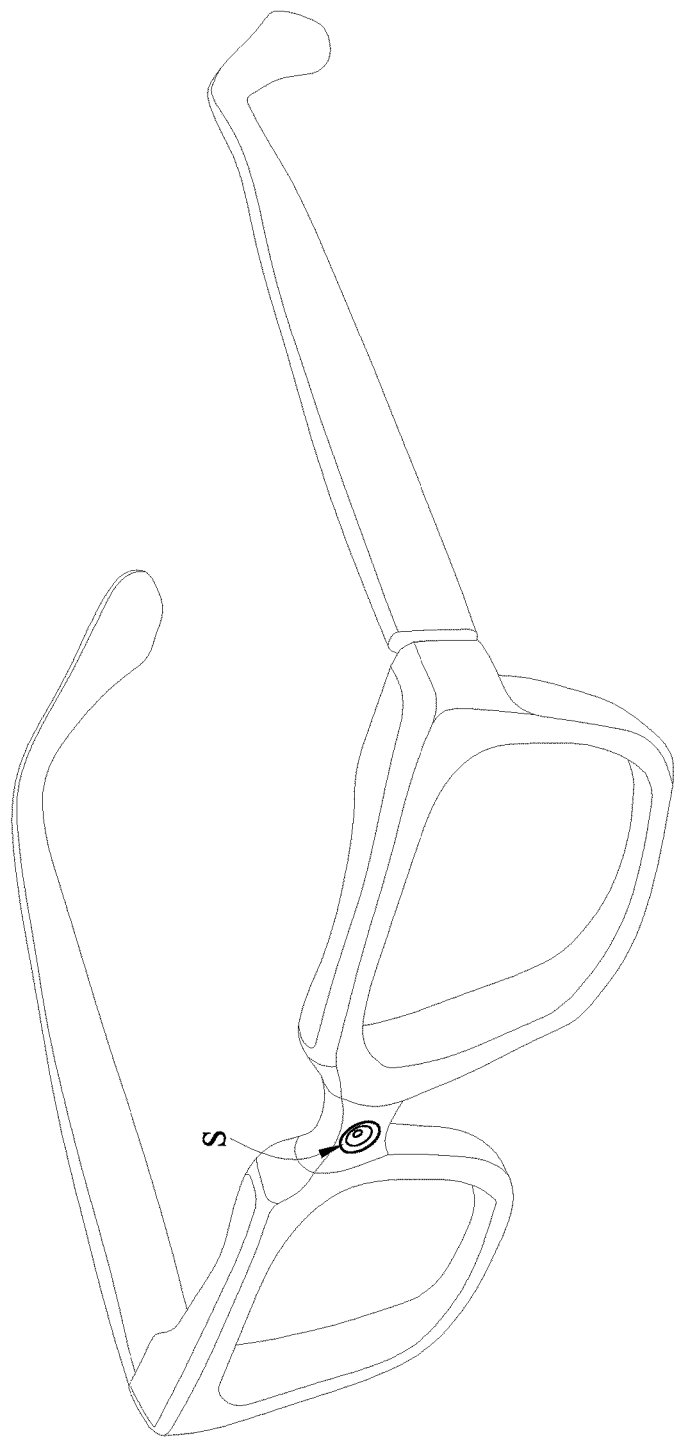
FIG. 16 shows an electronic device according to still another embodiment.

FIG. 12 is a schematic view of an image capturing module according to the 7th embodiment of the present disclosure. FIG. 13 is an enlarged view of the image capturing module in FIG. 12. In FIG. 12, an image capturing module S includes an image capturing system 7 and an image sensor 70. The image capturing system 7 includes a barrel 71, a lens assembly 72, a regulating structure 73, a planar light shielding sheet 74 and an image surface 75. The image sensor 70 is disposed on or near the image surface 75. The number of the regulating structure 73 and that of the planar light shielding sheet 74 are both one in this embodiment, but the present disclosure is not limited thereto. In some embodiments, the image capturing system 7 can include a plurality of regulating structures 73 and a plurality of planar light shielding sheets 74. Both the barrel 71 and the regulating structure 73 can be made of metallic material such as brass containing lead, phosphor bronze and copper alloys. The barrel 71 and the regulating structure 73 are an unitary structure.

The lens assembly 72 includes a plurality of lens elements 721 disposed in the barrel 71. The lens elements 721 are arranged sequentially from an object side of the image capturing system 7 to an image side of the image capturing system 7.

The regulating structure 73 includes an annular groove 731. The regulating structure 73 may have two openings 732 which are respectively located at two ends of the regulating structure 73 that are opposite to each other. The annular groove 731 may have two holes 7311 and 7312 which are respectively located at two ends of the annular groove 731 that are opposite to each other. The two openings 732, annular groove 731 and the two holes 7311 and 7312 are communicated with each other. Moreover, the regulating structure 73 may further include an opening narrow portion 733 located at a side of the regulating structure 73. Two ends of the opening narrow portion 733 that are opposite to each other are respectively located at the opening 732 close to the image side and the hole 7311. In this embodiment, the regulating structure 73 is located between the lens assembly 72 and the image sensor 70.

The planar light shielding sheet 74 can be made of carbonfeather composite material and has an aperture 741 for light to travel through. The planar light shielding sheet 74 is assembled to the annular groove 731 of the regulating structure 73, and the regulating structure 73 is for adjusting and limiting a position of the planar light shielding sheet 764. Moreover, the he planar light shielding sheet 74 is spaced apart from the lens elements 721.

The parameters in the 7th embodiment have the following values shown in millimeters (mm). The definitions of the parameters related to the regulating structure 73 correspond to that related to the space maintaining member in the 1st embodiment. The other definitions of the following parameters are the same as those stated in the 1st embodiment with corresponding values for the 7th embodiment, so an explanation in this regard will not be provided again.

| 7th Embodiment | | | |
|---|---|---|---|
| Φo | 5.80 | Φg | 6.30 |
| ΦA | 6.20 | (ΦS − Φ)/2 | 0.05 |
| ΦB | 5.90 | w | 0.06 |
| Φ | 6.20 | d | 0.03 |
| Φs | 6.30 | | |

Figure 17:
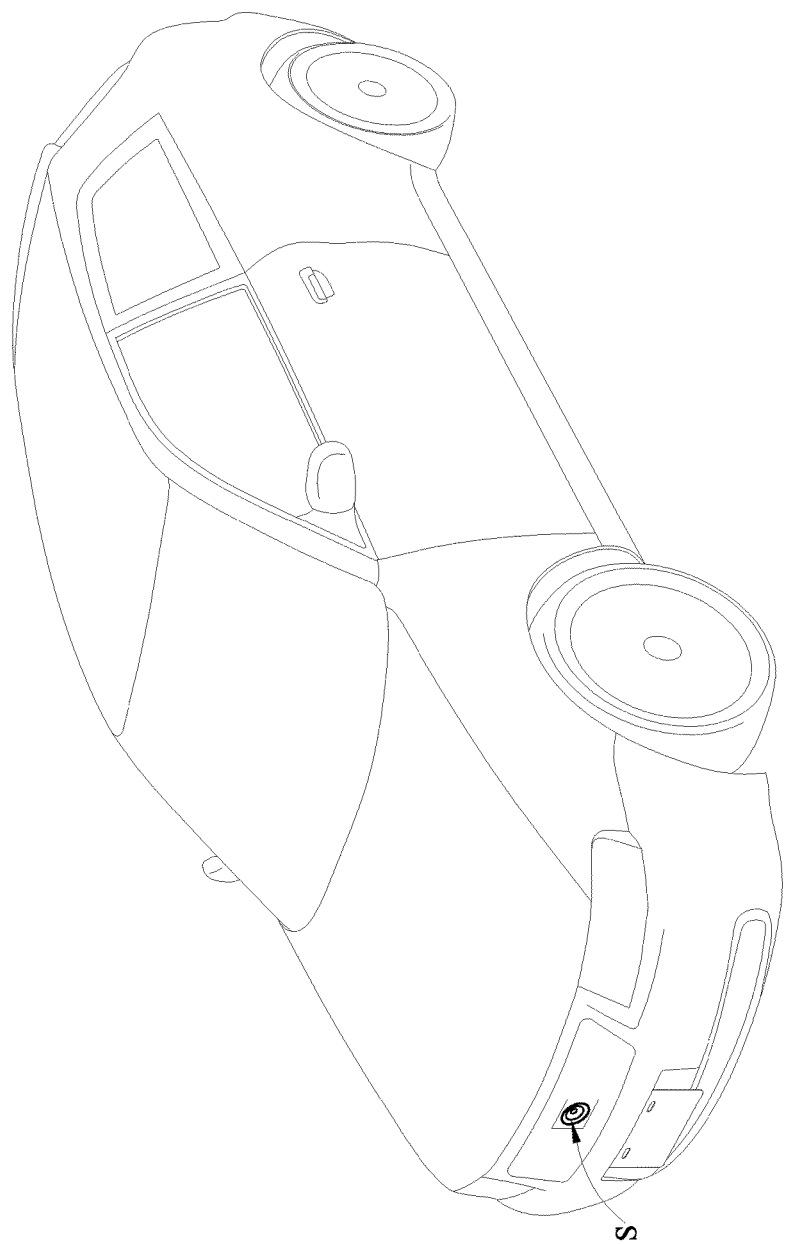
FIG. 17 shows an electronic device according to yet another embodiment.

In FIG. 14, FIG. 15, FIG. 16 and FIG. 17, the image capturing module S according to any embodiment of the present disclosure may be installed in, but not limited to, an electronic device, and the electronic device can be a smart phone (FIG. 14), a tablet personal computer (FIG. 15) a wearable device (FIG. 16) and a vehicle camera (FIG. 17). The electronic devices shown in the figures are only exemplary which the image capturing device in present disclosure is installed in, and the electronic devices are not limited thereto. In some embodiments, the electronic device can further include, but not limited to, a display unit, a control unit, a storage unit, a random access memory unit (RAM), a read only memory unit (ROM) or a combination thereof.

According to the present disclosure, the image capturing system can be optionally applied to optical systems with a movable focus. Furthermore, the image capturing system is featured with good capability in the correction of aberration and high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices.

According to the present disclosure, the image capturing system includes the regulating portion or the regulating structure for adjusting and limiting a position of the planar light shielding sheet. Therefore, it is favorable for properly arranging an axial distance between the planar light shielding sheet and the lens element that are adjacent to each other so as to prevent the planar light shielding sheet being shifted away from the optical axis or deformed, and thereby it is favorable for improving the image quality. Furthermore, the regulating portion is located at the space maintaining member so that it is favorable for improving the image quality with less components in the barrel, and thereby it is favorable for keeping the image capturing system compact.

The foregoing description, for the purpose of explanation, has been described with reference to specific embodiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:
1. An image capturing system, comprising:
a barrel;
a lens assembly comprising lens elements, and the lens elements being disposed in the barrel;
at least one planar light shielding sheet having an aperture for light to travel through; and
at least one space maintaining member disposed in the barrel, and the at least one space maintaining member being for adjusting a relative position of two of the lens elements;
wherein the at least one space maintaining member comprises a regulating portion, the regulating portion comprises an annular groove, the at least one planar light shielding sheet is assembled to the annular groove, and the regulating portion is for adjusting and limiting a position of the at least one planar light shielding sheet; a thickness of the at least one planar light shielding sheet is smaller than a width of the annular groove,
wherein the annular groove has two holes, the two holes are respectively located at two ends of the annular groove that are opposite to each other, and both diameters of the two holes are smaller than an outer diameter of the at least one planar light shielding sheet.
2. The image capturing system of claim 1, wherein the regulating portion and the at least one space maintaining member are integrally formed.

3. The image capturing system of claim 2, wherein the at least one space maintaining member has an end and an opening, the end touches one of the lens elements, the opening is located at the end, and a diameter of the annular groove is smaller than a diameter of the opening.

4. The image capturing system of claim 2, wherein a width of the annular groove is w, and the following condition is satisfied:

0.02 mm<$w$<0.12 mm.

5. The image capturing system of claim 4, wherein a thickness of the at least one planar light shielding sheet is d, and the following condition is satisfied: 0.01 mm<d<0.06 mm.

6. The image capturing system of claim 1, wherein the larger of the two diameters of the two holes is Φ, the outer diameter of the at least one planar light shielding sheet is Φs, and the following condition is satisfied:

0.01 mm<(Φ$s$−Φ)/2<0.07 mm.

7. The image capturing system of claim 1, wherein a width of the annular groove is w, and the following condition is satisfied:

0.03 mm<$w$<0.09 mm.

8. The image capturing system of claim 1, wherein the at least one planar light shielding sheet is spaced apart from the lens elements.

9. The image capturing system of claim 1, wherein the at least one space maintaining member is made of metallic material.

10. The image capturing system of claim 1, wherein the regulating portion comprises an opening narrow structure located at a side of the regulating portion, and the at least one planar light shielding sheet is assembled to the annular groove from the side of the regulating portion at which the opening narrow structure is located.

11. The image capturing system of claim 10, wherein a minimum diameter of the opening narrow structure is smaller than the outer diameter of the at least one planar light shielding sheet.

12. The image capturing system of claim 11, wherein the minimum diameter of the opening narrow structure is equal to either the diameter of one of the two holes or the diameter of the other one of the two holes.

13. An image capturing module, comprising:
the image capturing system of claim 1; and
an image sensor, wherein the image sensor is disposed on an image side of the image capturing system.

14. An electronic device, comprising:
the image capturing module of claim 13.

15. An image capturing system, comprising:
a barrel;
a lens assembly comprising lens elements, and the lens elements being disposed in the barrel; and
at least one planar light shielding sheet disposed in the barrel, wherein the at least one planar light shielding sheet is spaced apart from the lens elements;
wherein the image capturing system further comprises at least one regulating structure, the at least one regulating structure comprises an annular groove, the at least one planar light shielding sheet is assembled to the annular groove, the regulating structure is for adjusting and limiting a position of the at least one planar light shielding sheet, and the at least one regulating structure and the barrel are an unitary structure,
wherein the annular groove has two holes, the two holes are respectively located at two ends of the annular groove that are opposite to each other, and diameters of both of the two holes are smaller than an outer diameter of the at least one planar light shielding sheet.

16. The image capturing system of claim 15, wherein the at least one regulating structure comprises an opening narrow portion located at a side of the at least one regulating structure, and the at least one planar light shielding sheet is assembled to the annular groove from the side of the regulating structure at which the opening narrow portion is located.

17. The image capturing system of claim 16, wherein a minimum diameter of the opening narrow portion is smaller than the outer diameter of the at least one planar light shielding sheet.

18. The image capturing system of claim 15, wherein the larger of the two diameters of the two holes is Φ, the outer diameter of the at least one planar light shielding sheet is Φs, and the following condition is satisfied:

0.01 mm<(Φ$s$−Φ)/2<0.07 mm.

19. The image capturing system of claim 15, wherein a thickness of the at least one planar light shielding sheet is d, and the following condition is satisfied:

0.01 mm<$d$<0.06 mm.

20. The image capturing system of claim 15, wherein a width of the annular groove is w, and the following condition is satisfied:

0.03 min<$w$<0.09 mm.

21. The image capturing system of claim 15, wherein the at least one regulating structure is made of metallic material.

22. The image capturing system of claim 15, wherein the barrel is made of metallic material.

* * * * *